United States Patent
Hara et al.

(10) Patent No.: US 7,139,026 B2
(45) Date of Patent: Nov. 21, 2006

(54) IMAGING DEVICE WITH SUPPRESSED INTER-COLUMN VARIATIONS

(75) Inventors: Kunihiko Hara, Tokyo (JP); Eiichi Funatsu, Tokyo (JP); Takayuki Usui, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 712 days.

(21) Appl. No.: 10/166,198

(22) Filed: Jun. 11, 2002

(65) Prior Publication Data

US 2003/0117509 A1 Jun. 26, 2003

(30) Foreign Application Priority Data

Dec. 20, 2001 (JP) ............... 2001-388004

(51) Int. Cl.
*H04N 5/335* (2006.01)

(52) U.S. Cl. .................... 348/308

(58) Field of Classification Search ............ 348/308, 348/241; 250/208.1

See application file for complete search history.

(56) References Cited

U.S. PATENT DOCUMENTS

| | | | | |
|---|---|---|---|---|
| 4,037,218 A | * | 7/1977 | Groeger et al. | 365/104 |
| 4,544,878 A | * | 10/1985 | Beale et al. | 323/315 |
| 5,917,547 A | * | 6/1999 | Merrill et al. | 348/301 |
| 6,483,541 B1 | * | 11/2002 | Yonemoto et al. | 348/302 |
| 6,559,718 B1 | * | 5/2003 | Kudo et al. | 330/252 |
| 6,762,398 B1 | * | 7/2004 | Tanaka | 250/208.1 |

FOREIGN PATENT DOCUMENTS

JP 11274463 10/1999

OTHER PUBLICATIONS

Roger A. Panicacci, et al., 128Mb/s Multiport CMOS Binary Active-Pixel Image Sensor, IEEE International Solid-State Circuits Conference, Digest of Technical Papers, 1996, pp. 80-81, pp. 372-373.

Roger A. Panicacci, et al., 128Mb/s Multiport CMOS Binary Active-Pixel Image Sensor, IEEE International Solid-State Circuits Conference, Digest of Technical Papers, pp. 100-101.

Junichi Nakamura et al., On-Focal-Plane Signal Processing for Current-Mode Active Pixel Image Sensors, ITE Technical Report vol. 21, No. 61, 1997, pp. 13-18.

* cited by examiner

*Primary Examiner*—David Ometz
*Assistant Examiner*—Adam L. Henderson
(74) *Attorney, Agent, or Firm*—Buchanan Ingersoll & Rooney PC (57) ABSTRACT

An imaging device reads an output level of a pixel circuit constituting a pixel array by supplying current to the pixel circuit. It reads a signal level and reset level from the pixel circuit by supplying it with the current from a current source circuit, and stores them into a line memory. A pixel level of the pixel circuit is obtained by a differential amplifier that outputs the difference between the signal level and reset level of the same pixel circuit. The gate potential of a current copier transistor that supplies the read current is set at a value that enables the read current to take a constant value from column to column of the pixel array. The image device can suppress variations in the current copier circuit provided for each array column of the pixel circuits, thereby reducing string-like noise in the image picked up.

7 Claims, 6 Drawing Sheets

IMAGING DEVICE WITH SUPPRESSED INTER-COLUMN VARIATIONS

BACKGROUND OF THE INVENTION

1. Field of the Invention

The present invention relates to an imaging device capable of suppressing variations between array columns consisting of pixel circuits constituting an image sensor.

2. Description of Related Art

Figure 6:
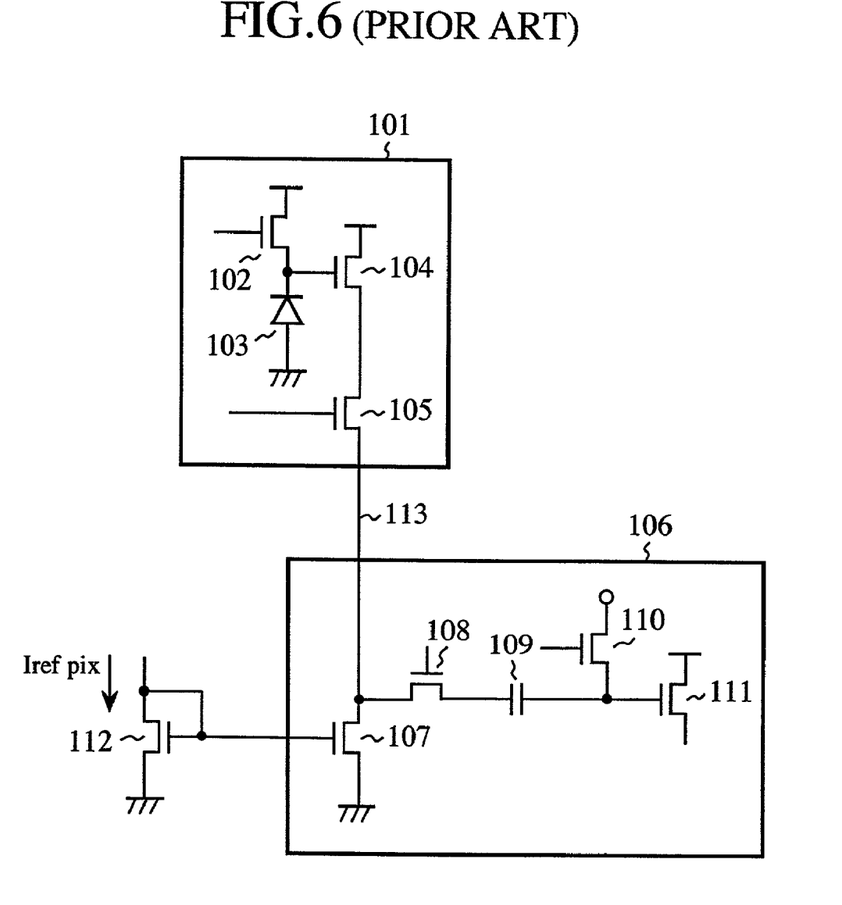
FIG. 6 is a circuit diagram showing a configuration of a conventional imaging device.

FIG. 6 is a circuit diagram showing a schematic configuration of a conventional imaging device. The conventional imaging device is described in "128 Mb/s Multiport CMOS Binary Active-Pixel Image Sensor" by Roger A. Panicacci, et. al., ISSCC96 SESSION 6, PAPER TP 6.5 (pp. 80–81 and 372–373), a part of which is shown in this figure. In FIG. 6, the reference numeral 101 designates a unit pixel circuit constituting a pixel array with other unit pixel circuits 101. The reference numeral 102 designates a reset switch for resetting a photodiode 103 of the unit pixel circuit 101; 103 designates the photodiode for generating a potential corresponding to an amount of input light; 104 designates a source follower transistor for reading and amplifying the output potential of the photodiode 103; and 105 designates an output selecting transistor for the output operation of the unit pixel circuit 101 selected by an external input signal. The unit pixel circuit 101 consists of the reset switch 102, photodiode 103, source follower transistor 104, and output selecting transistor 105.

The reference numeral 106 designates a column memory provided for each array column of the pixel array. For the sake of simplicity, only a pair of unit pixel circuit 101 and column memory 106 is shown. The reference numeral 107 designates a bias transistor for supplying the source follower transistor 104 with a constant current when reading the output potential from the unit pixel circuit 101 to the column memory 106; 108 designates a sampling transistor for leading the output potential of the source follower transistor 104 to a clamp capacitor 109; 109 designates the clamp capacitor for clamping the output potential of the source follower transistor 104; 110 designates a clamp transistor for clamping the output side of the clamp capacitor 109; and 111 designates an output transistor for generating pixel data from the column memory 106. The column memory 106 consists of the bias transistor 107, sampling transistor 108, clamp capacitor 109, clamp transistor 110, and output transistor 111. The reference numeral 112 designates an input transistor of a current-mirror circuit for determining the output current of the bias transistor 107; and 113 designates an output line for connecting the unit pixel circuit 101 to the column memory 106.

Next, the operation of the conventional imaging device will be described.

First, the reset switch 102 resets the photodiode 103. Receiving the incident light, the photodiode 103 stores electric charges, and outputs a potential corresponding to an amount of the incident light. The potential is applied to the gate of the source follower transistor 104. After applying the light to the photodiode 103 for a fixed time period to store the electric charges, a controller (not shown) supplies the gate of the output selecting transistor 105 with a signal for selecting the unit pixel circuit 101. Thus, a circuit is established between the source follower transistor 104 and the bias transistor 107 so that the signal level of the unit pixel circuit 101 is supplied to the column memory 106 via the output line 113.

The output line 113 is provided with a signal level equal to the potential output from the photodiode 103 minus the threshold voltage of the source follower transistor 104 in response to the incident light. The signal level applied to the output line 113 is fed to the column memory 106. In the column memory 106, the sampling transistor 108 controls its sampling timing by switching, thereby supplying the signal level to the input side of the clamp capacitor 109. In this case, the output side of the clamp capacitor 109 is fixed at the clamp potential by the output of the clamp transistor 110. Subsequently, the output of the clamp transistor 110 is turned off to bring the output side of the clamp capacitor 109 into a floating state. Then, the photodiode 103 is reset again. In this case, the reset level, which is equal to the potential output of the photodiode 103 minus the threshold voltage value of the source follower transistor 104, is supplied to the input side of the clamp capacitor 109 via the output line 113. Thus, the potential at the output side of the clamp capacitor 109 that is held at the fixed clamp potential is increased by the potential given by the following expression.

(reset level of photodiode 103)−(signal level of photodiode 103)

The output transistor 111 carries out predetermined processing of the potential increased from the clamp potential, and outputs the result from the column memory 106 as its pixel output.

Using such correlated double sampling, the conventional imaging device compares the signal level with the reset level output from the same pixel, thereby suppressing fixed pattern noise resulting from the variations in the threshold voltage values of the transistors constituting the unit pixel circuit 101 and the like.

With the foregoing configuration, the conventional imaging device can suppress the fixed pattern noise resulting from the variations in the threshold voltages of the transistors constituting the unit pixel circuit 101. However, it has a problem of generating fixed vertical string-like pattern noise in an image on the imaging device if the bias transistor 107 in the column memory 106, which is disposed in each column of the array consisting of the unit pixel circuits 101, has variations, and hence the bias current has variations between the array columns.

This will be described in more detail. The fixed pattern noise appearing in the image picked up arises from the variations in the output potential between the pixel circuits, which is affected by the variations in the threshold values of the source follower transistors 104 and bias transistors 107. The noise arising from the variations in the characteristics of the source follower transistors 104 appears at random in the image. In contrast, the noise arising from the variations in the characteristics of the bias transistors 107 appears as the string-like noise because it brings about the variations in the array columns. From the characteristics of the human eye, the visual perception for the string-like noise is about three times more acute than for the random noise. Accordingly, the variations in the bias transistors 107 that generate the string-like noise must be reduced about ⅓ or less of the variations in the source follower transistors 104 that produce the random noise. However, the variations in the bias transistors 107 and source follower transistors 104 are nearly the same, because they are formed in the same device. In addition, the bias transistors 107 constitute a current-mirror circuit in the circuit configuration, and their characteristic variations have equal to or greater effect on the potentials to be sampled than the characteristic variations in the source follower transistors 104. As a result, the configuration of the conventional imaging device has a problem of making it difficult to suppress the string-like noise.

SUMMARY OF THE INVENTION

The present invention is implemented to solve the foregoing problem. It is therefore an object of the present invention to provide an imaging device capable of suppressing the string-like noise by reducing the variations in the bias current of each array column in spite of the variations in the characteristics of the bias transistors.

According to one aspect of the present invention, there is provided an imaging device that includes a read current source unit having for each array column a current copier circuit for supplying a read current to the array column, and that stores into a memory the pixel level read from the pixel circuit by supplying the read current from the current copier circuit to the array column including the pixel circuit from which the pixel output is to be read. With this configuration, the current copier circuit can output a constant read current, thereby suppressing the string-like noise in the image.

DETAILED DESCRIPTION OF THE PREFERRED EMBODIMENTS

The invention will now be described with reference to the accompanying drawings.

Embodiment 1

Figure 1:
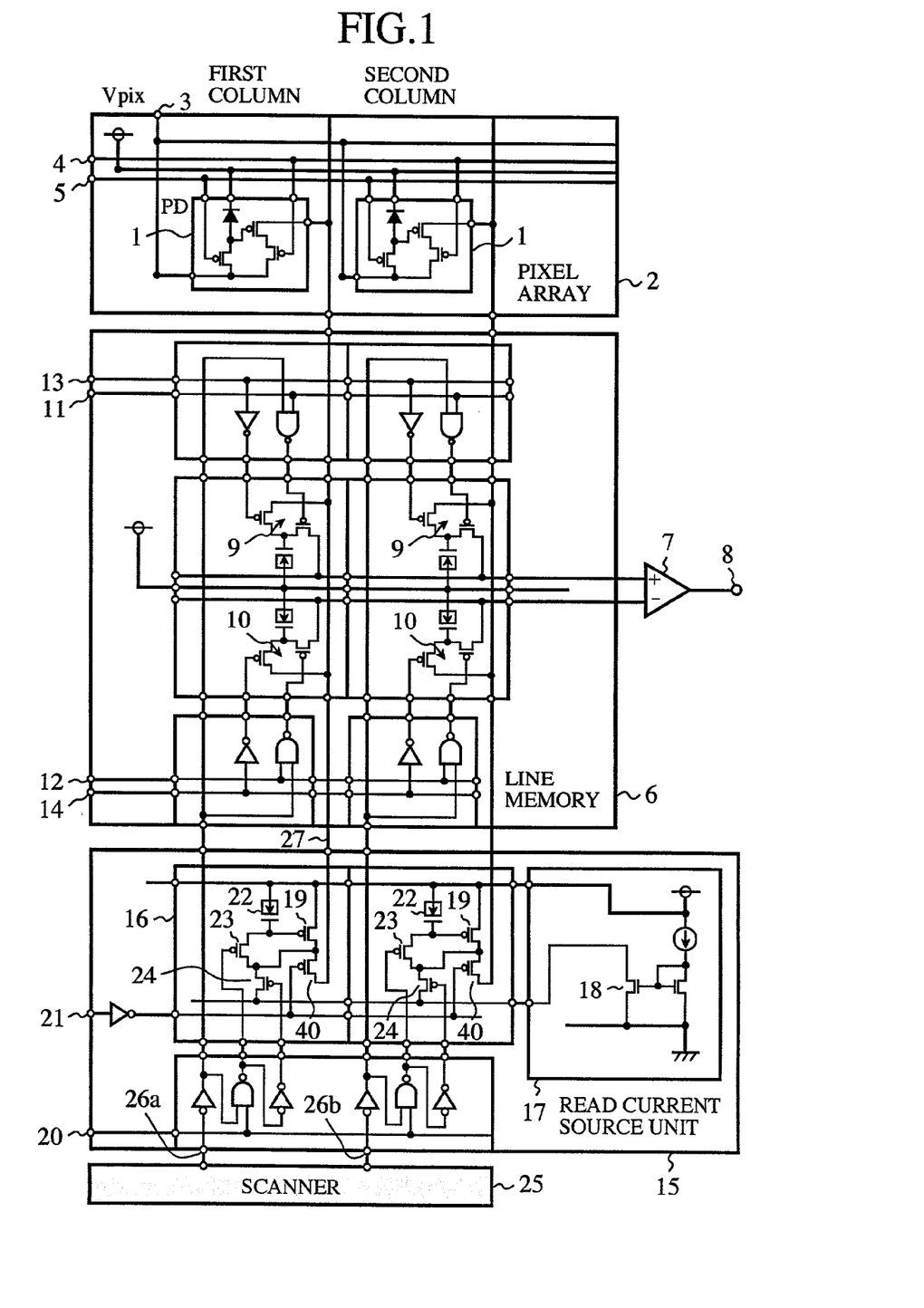
FIG. 1 is a circuit diagram showing a configuration of an embodiment 1 of the imaging device in accordance with the present invention.

FIG. 1 is a circuit diagram showing a configuration of an embodiment 1 of the imaging device in accordance with the present invention. In this figure, the reference numeral 1 designates a pixel circuit including a photodiode, a source follower transistor and so on; 2 designates a pixel array including a plurality of pixel circuits 1 disposed in an array; 3 designates a constant potential terminal for supplying the pixel array 2 with a constant potential; 4 designates a read access terminal that is asserted to read the pixel level of the pixel circuit 1; and 5 designates a reset access terminal that is asserted to reset the pixel circuit 1.

The pixel array 2 comprises the plurality of pixel circuits 1, the constant potential terminal 3, read access terminal 4 and reset access terminal 5. Although FIG. 1 shows an example that includes only two pixel circuits 1 in a row, the pixel array 2 includes a number of pixel circuits 1 disposed in an array necessary for forming an image.

The reference numeral 6 designates a line memory for storing the pixel levels output from the pixel array 2. The reference numeral 7 designates a differential amplifier for outputting the difference between the signal level of the pixel and the reset level output from the pixel circuit 1; 8 designates an output terminal of the differential amplifier 7; 9 designates a signal level memory for storing the signal level of the pixel circuit 1; 10 designates a reset level memory for storing the reset level of the pixel circuit 1; 11 designates a signal level access terminal that is asserted to supply the signal level from the signal level memory 9 to the differential amplifier 7; 12 designates a reset level access terminal that is asserted to supply the reset level from the reset level memory 10 to the differential amplifier 7; 13 designates a signal level memory access terminal that is asserted to store the signal level of the pixel circuit 1 into the signal level memory 9; and 14 designates a reset level memory access terminal that is asserted to store the reset level of the pixel circuit 1 into the reset level memory 10.

The line memory 6 comprises the signal level memories 9, reset level memories 10, signal level access terminal 11, reset level access terminal 12, signal level memory access terminal 13 and reset level memory access terminal 14. Although FIG. 1 shows the line memory 6 for the two-column pixel circuits 1, the line memory 6 actually includes a plurality of signal level memories 9, reset level memories 10 and terminals needed for controlling them in accordance with the number of columns of the pixel circuits 1 constituting the pixel array 2.

The reference numeral 15 designates a read current source unit for supplying a read current to the pixel circuits 1 of each array column. The reference numeral 16 designates a current copier circuit installed in the read current source unit 15 for supplying the read current to the pixel circuit 1 selected to output the pixel level. The reference numeral 17 designates a current source circuit for supplying the current copier circuit 16 with a constant current. The reference numeral 18 designates an output transistor of a current-mirror circuit constituting the current source circuit 17; 19 designates a current copier transistor for copying the current output from the current source circuit 17, and for supplying it to the pixel array 2; 20 designates an enabling terminal that is asserted to set the gate potential of the current copier transistor 19; 21 designates an enabling terminal that is asserted to supply the pixel array 2 with the read current of the pixel level; 22 designates a capacitor for storing the gate potential of the current copier transistor 19; 23 and 24 designate a switching transistor that is turned on to store the gate potential of the current copier transistor 19 into the capacitor 22; and 40 designates a switching transistor for connecting the source of the current copier transistor 19 with a read line 27 which will be described later, when the enabling terminal 21 is asserted.

The reference numeral 25 designates a scanner for accessing each array column including the pixel circuits 1 (the column of the pixel circuits 1 constituting the pixel array 2 is called an array column from now on). Reference numerals 26a and 26b each designate a scanner output terminal that is asserted by the scanner 25 to access the corresponding array column. The reference numeral 27 designates a read line for transferring the signal level and reset level read from the pixel circuit 1 to the signal level memory 9 and reset level memory 10, respectively.

The read current source unit 15 comprises the current copier circuit 16, current source circuit 17, enabling terminal 20, enabling terminal 21, and scanner output terminals 26a and 26b. The current copier circuit 16 comprises the current copier transistor 19, capacitor 22, and switching transistors 23 and 24. Although FIG. 1 shows the read current source unit 15 for accessing the pixel array 2 with two-column pixel circuits 1, the signal level memories 9 and reset level memories 10 in the line memory 6, and the current copier circuits 16 in the read current source unit 15 are each provided by the number of the columns of the pixel circuits 1 constituting the pixel array 2, that is, for each array column.

Next, the operation of the present embodiment 1 of the imaging device in accordance with the present invention will be described.

Figure 2:
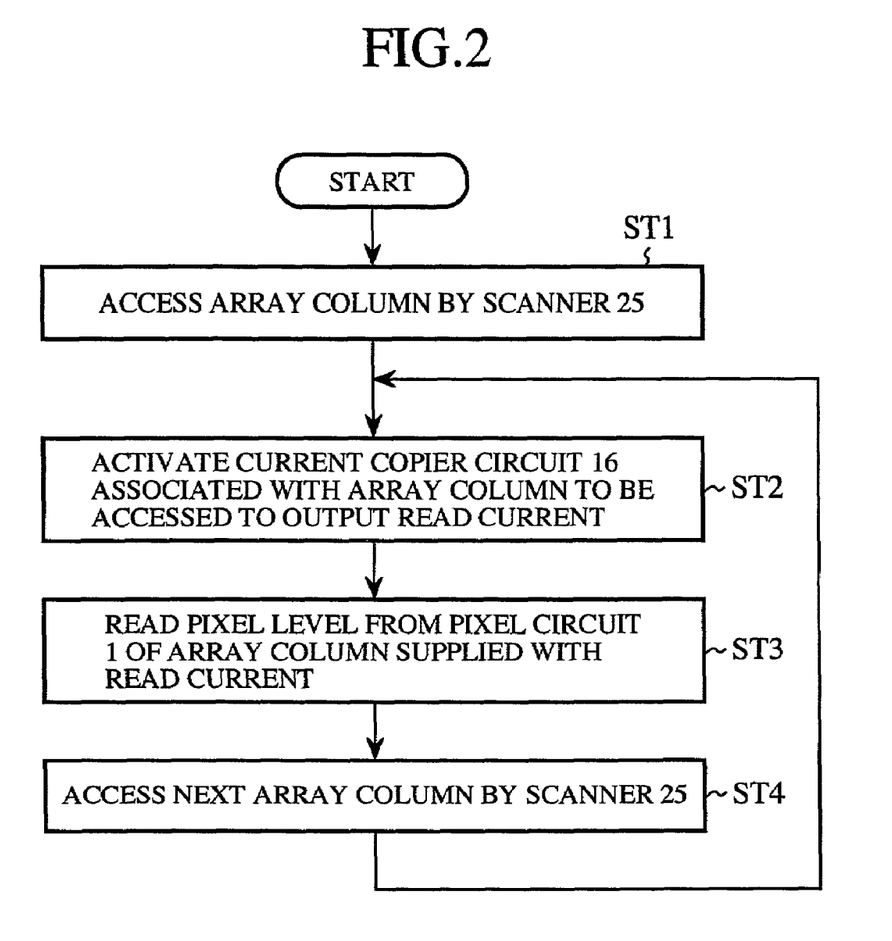
FIG. 2 is a flowchart illustrating the operation of the embodiment 1 of the imaging device.

FIG. 2 is a flowchart illustrating the basic operation of the present embodiment 1. The operation of the individual blocks constituting the imaging device will be described with reference to FIG. 2.

First, the operation of the read current source unit 15 as shown in FIG. 1 will be described. When the scanner 25 asserts the scanner output terminal 26a while the enabling terminal 20 is asserted by the high level, for example (step ST1), the switching transistors 23 and 24 associated with the first-column pixel circuit 1 are turned on. Accordingly, the output transistor 18 of the current source circuit 17 feeds the constant current, thereby applying a potential to the gate of the current copier transistor 19.

Using the constant current output from the read current source unit 15, that is, the constant current output from the current source circuit 17 makes it possible to set the gate potential of the current copier transistor 19 at a value that causes the same current as the constant current to flow across the drain and source of the current copier transistor 19. In other words, the gate potential of the current copier transistor 19 is a setting potential for establishing the read current the current copier transistor 19 outputs.

Subsequently, when the enabling terminal 21 is asserted by the high level, the switching transistor 40 is turned on, and the current equal to the current fed from the current source circuit 17 flows across the drain and source of the current copier transistor 19. This is because the current copier transistor 19 becomes the diode connection, thereby constituting the input stage transistor of a mirror circuit in the current copier circuit 16. The current copier transistor 19 outputs the same current as the current source circuit 17, and the output current is supplied to the first array column of the pixel array 2 via the read line 27 (step ST2). The output current is used as the read current for reading the pixel level from the pixel circuit 1 of the array column corresponding to the current copier circuit 16.

Subsequently, the signal level and reset level are read from the pixel circuit 1 of the first array column as will be described below (step ST3), and undergo prescribed processing. Then, the scanner 25 starts an access to the second array column by asserting the scanner output terminal 26b. When the access to the second array column is started, the switching transistors 23 and 24 of the current copier circuit 16 associated with the first array column are turned off (step ST4). At that moment, the capacitor 22 latches the gate potential (setting potential) of the current copier transistor 19 that supplies the read current to the first array column. Subsequently, the switching transistors 23 and 24 of the current copier circuit 16, which supply the read current to the pixel circuit 1 constituting the second array column, are turned on, and operate in the same manner as those in the current copier circuit 16 associated with the first-column pixel circuit 1. Thus, the second array column is supplied with the read current (step ST2), and the operation is carried out in the same manner as when the pixel level is read from the pixel circuit 1 of the first array column (step ST3). When the scanner 25 starts accessing the third array column (not shown), the switching transistors 23 and 24 of the current copier circuit 16 associated with the second array column are turned off, and the capacitor 22 latches the potential applied to the gate of the current copier transistor 19 at the time when the read current is supplied to the second array column.

Subsequently, the scanner 25 accesses the third array column, and the corresponding current copier circuit 16 operates to read the pixel level from the pixel circuit 1 of the third array column. Such an operation is iterated sequentially for all the array columns constituting the pixel array 2.

Next, the operation of the pixel array 2 will be described.

The present embodiment 1 of the imaging device uses the correlated double sampling method for eliminating the effect of the threshold voltages of the transistors constituting the pixel circuit 1 to obtain its pixel output, for example. The correlated double sampling operates as follows. First, it stores the signal level read from the pixel circuit 1 into the signal level memory 9. Second, it resets the pixel circuit 1, reads the reset level, and stores it into the reset level memory 10. Finally, it supplies the contents stored in the memories to the differential amplifier 7 that outputs the difference between them as the pixel level. Thus, it can produce the pixel output without the effect of the variations in the threshold voltages of the transistors constituting the individual pixel circuits 1, even if they have the variations.

Next, the operation and processing of the pixel array 2 carrying out the correlated double sampling will be described. Here, the operation of the pixel array 2 corresponds to the foregoing step ST3 of FIG. 2.

First, the photodiodes of the pixel circuits 1 disposed in the same row are reset by asserting the reset access terminal 5. Subsequently, the pixel circuits 1 that are reset each store the electric charges by converting the incident light. After a fixed storage time has elapsed, the current copier circuit 16 supplies the pixel circuit 1 of each array column with the read current. Thus, the signal level obtained by converting the incident light is read out of the pixel circuit 1 placed at the array row and the array column supplied with the read current.

Next, the transfer operation of the signal level of the pixel circuit 1 will be described.

As described above of the operation of the read current source unit 15, when the enabling terminal 20 is placed at the low level and the enabling terminal 21 at the high level, and the scanner 25 accesses the first array column, for example, the current copier circuit 16 associated with the first array column is ready to supply the read current to the first array column. In this case, since the potential latched by the capacitor 22 is being applied to the gate of the current copier transistor 19 in the current copier circuit 16, the current copier transistor 19 copies the current of the same magnitude as the current output from the current source circuit 17, and the copied current flows into the first array column of the pixel array 2 via the read line 27. Thus, the current with the constant value is supplied to all the pixel circuits 1 disposed in the same array column of the pixel array 2.

Subsequently, the signal level memory 9 is reset by placing the signal memory access terminal 13 of the line memory 6 at the high level. In addition, asserting the read access terminal 4 of the pixel array 2 enables the current copier circuit 16 associated with the first array column to supply the pixel circuit 1 with the read current. In response to the read current, the pixel circuit 1 outputs the signal level so that it is stored into the signal level memory 9 associated with the first array column.

Next, the transfer operation of the reset level of the pixel circuit 1 will be described. After storing the signal level read from the pixel circuit 1 into the signal level memory 9, the pixel circuit 1 from which the signal level is read is reset by asserting the reset access terminal 5 of the pixel array 2. Subsequently, the reset level memory 10 is reset by placing the reset level memory access terminal 14 of the line memory 6 at the high level. Subsequently, the current copier circuit 16 associated with first array column supplies the pixel circuit 1 with the read current, again, by asserting the read access terminal 4 of the pixel array 2. The pixel circuit 1 supplied with the read current outputs the reset level. The reset level thus read is stored into the reset level memory 10 associated with the first array column in the line memory 6.

In this way, the present embodiment 1 stores the signal level and reset level of the pixel circuit 1 into the signal level memory 9 and reset level memory 10, respectively, and asserts the signal level access terminal 11 and reset level access terminal 12 of the line memory 6, thereby reading from the signal level memory 9 and reset level memory 10 the signal level and reset level of the pixel circuit 1 of the first array column specified by the scanner 25. Subsequently, it supplies the signal level and reset level the scanner 25 reads from the memories to the differential amplifier 7 that obtains the difference between them. The difference is output from the output terminal 8 as the pixel output.

The present embodiment 1 performs for each pixel circuit 1 the foregoing processing of the signal level and reset level, that is, reading them, storing them into the line memory 6, and processing them by the differential amplifier 7, by using the signal level memory 9 and reset level memory 10 associated with the pixel circuit 1.

Here, the foregoing processing corresponds to step ST3 of FIG. 2.

As described before in the prior art, the current supplied to each array column can vary from column to column because of the characteristic variations of the transistors constituting the read current source unit 15, and this causes the variations in the pixel levels output from the pixel circuits of each array column, which is perceived as the string-like noise to the human eye. The present embodiment 1 of imaging device, however, is configured such that although the threshold value varies of each current copier transistor 19 for supplying the current to the array column, the gate of each current copier transistor 19 latches the potential that causes the current equal to the output of current source circuit 17 to flow across the drain and source of the current copier transistor 19, thereby making it possible to supply each array column with the read current of the same magnitude. Thus, the present embodiment 1 can markedly suppress the variations in the pixel levels between the array columns. Specifically, it can reduce the noise resulting from the characteristic variations of the current copier transistors 19 to equal to or less than ⅓ of the noise resulting from variations such as in the threshold voltages of the source follower transistors constituting the pixel circuits 1, thereby being able to reduce the string-like noise to below the perceptible level of the human eye.

As described above, the present embodiment 1 is configured such that the current copier circuits 16 supply all the pixel circuits 1 with the constant current, and obtains each pixel level from the difference between the signal level and reset level using the correlated double sampling. Thus, the present embodiment 1 offers an advantage of being able to produce the pixel levels from which the noise is reduced which results from the variations in the transistors constituting the individual circuits.

In addition, the present embodiment 1 is configured such that it establishes the gate potential of each current copier transistor 19 while the scanner 25 is not performing the output control of each memory, which requires special consideration when using the current copier circuit. Therefore, the present embodiment 1 can improve the efficiency of the scanner 25, and makes it unnecessary to provide a sequence period for newly setting the current source circuit 17, and to install a scanner for newly driving the current source circuit 17. Thus, it offers an advantage of being able to reduce the size of the circuits constituting the imaging device.

Embodiment 2

Figure 3:
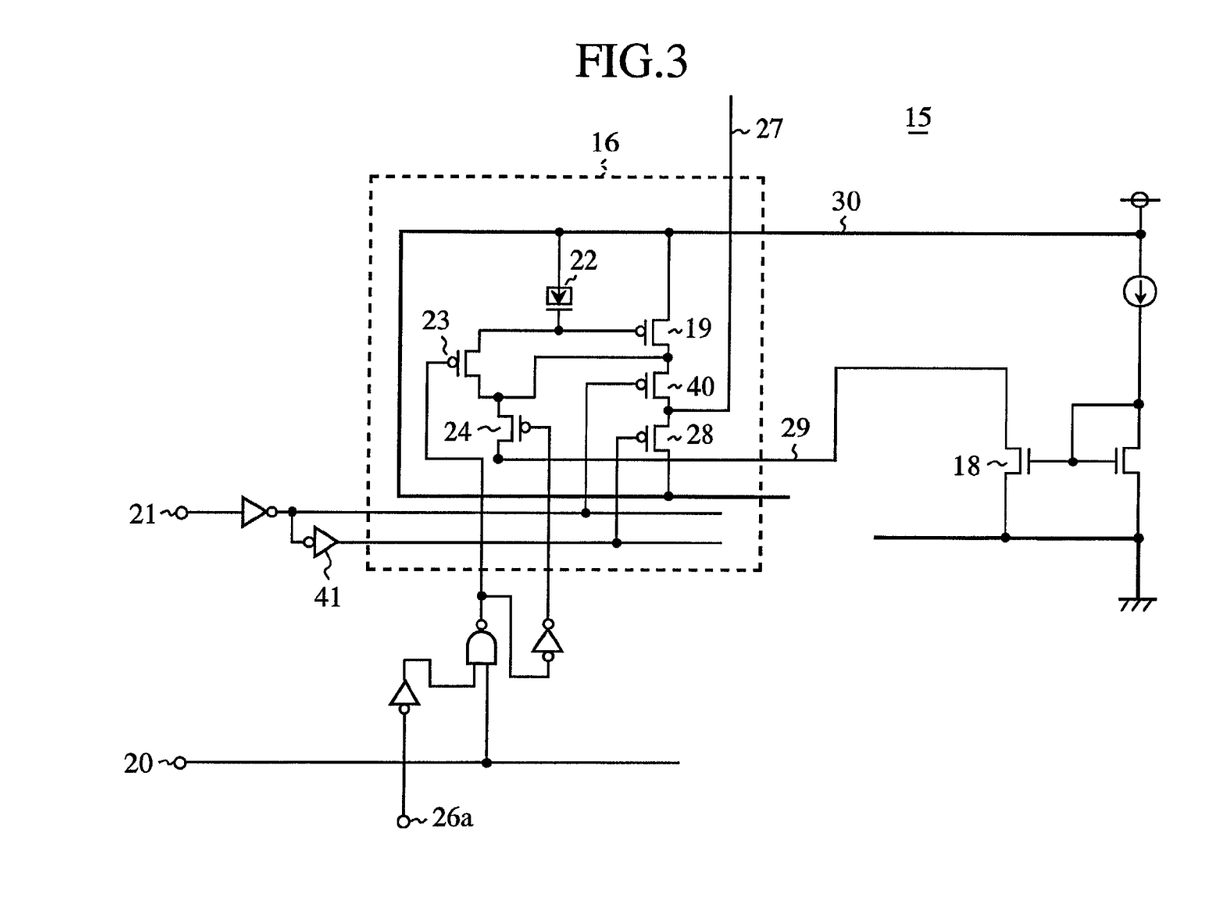
FIG. 3 is a circuit diagram showing a configuration of an embodiment 2 of the imaging device in accordance with the present invention.

FIG. 3 is a circuit diagram showing a configuration of an embodiment 2 of the imaging device in accordance with the present invention. FIG. 3 shows only a portion corresponding to the read current source unit 15 of the imaging device as shown in FIG. 1, without showing the pixel array 2 and line memory 6 with the same configurations as those of FIG. 1. Here, the same or like portions to those of FIG. 1 are designated by the same reference numerals, and the description thereof is omitted. In FIG. 3, the reference numeral 28 designates a switching transistor for making or breaking the connection between a power feed line 30 and the read line 27; 30 designates the power feed line used by the current source circuit 17 to output its current; and 41 designates an inverter for inverting the signal supplied to the enabling terminal 21.

Next, the operation of the present embodiment 2 will be described.

Here, only the operation of the portions shown in FIG. 3 will be described with omitting the operation of the same or like portions to those of FIG. 1.

Since the basic operation of the embodiment 2 is the same as that of the imaging device shown in FIG. 2, the description thereof is omitted here.

As for the operation of the read current source unit 15 of the foregoing embodiment 1, when no current is supplied to the read line 27 as in the case where the scanner output terminal 26a and enabling terminal 20 are asserted while the enabling terminal 21 is not asserted, and hence the switching transistor 40 is brought out of conduction, the read line 27 becomes a floating state and is susceptible to external noise. This will have an adverse effect such as noise on the reading operation of the pixel levels by the remaining array columns. In contrast, the present embodiment 2 supplies the read line 27 with a predetermined potential when the switching transistor 40 is out of conduction, that is, when the current copier transistor 19 does not supply the read current, in order to carry out the read operation of the pixel levels accurately. Thus, the present embodiment 2 can stabilize the operation of the individual circuits constituting the imaging device such as the pixel array 2.

The switching transistor 40 is conducting when the enabling terminal 21 is at the high level so that the current copier transistor 19 outputs the read current. In contrast, when the enabling terminal 21 is placed at the low level, the switching transistor 40 is turned off so that the output of the current copier transistor 19 is interrupted. In this case, the signal supplied to the enabling terminal 21 is supplied to the gate of the switching transistor 28 via the inverter 41. Thus, the switching transistor 40 and the switching transistor 28 make the opposite switching operation. As a result, when the output of the current copier transistor 19 is interrupted, the read line 27 is supplied with the predetermined potential from the power feed line 30 via the switching transistor 28.

On the other hand, when the current copier transistor 19 supplies the read current, the switching transistor 28 is in the off state so that the potential is not supplied from the power feed line 30 to the read line 27.

As described above, the embodiment 2 is configured such that the read line 27 is supplied with the predetermined potential while the current copier transistor 19 is being set, thereby preventing the read line 27 from becoming the floating state.

As a result, the present embodiment 2 offers an advantage of being able to prevent the noise intrusion to the individual circuits constituting the imaging device such as the pixel array 2, thereby increasing the noise resistance.

Embodiment 3

Figure 4:
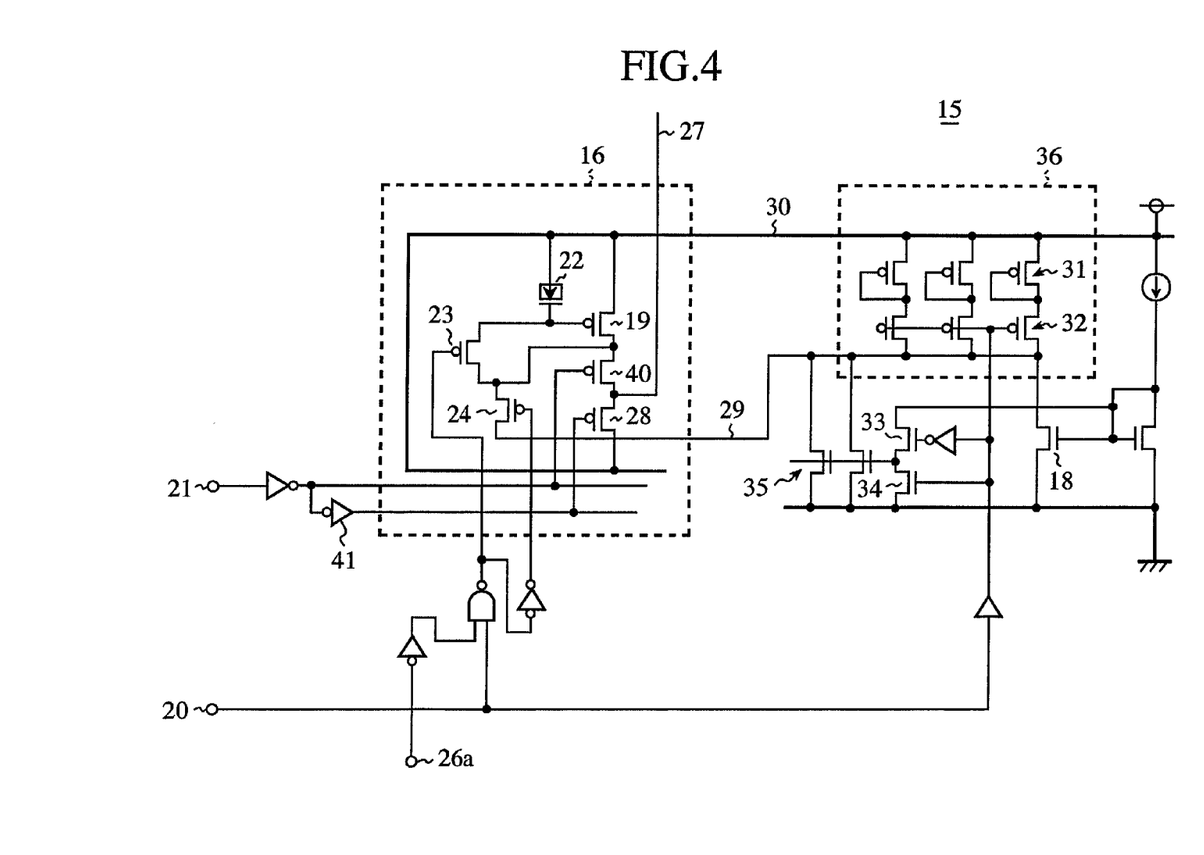
FIG. 4 is a circuit diagram showing a configuration of an embodiment 3 of the imaging device in accordance with the present invention.

FIG. 4 is a circuit diagram showing a configuration of an embodiment 3 of the imaging device in accordance with the present invention. FIG. 4 shows only a portion corresponding to the read current source unit 15 of the imaging device as shown in FIG. 1 without showing the pixel array 2 and line memory 6 with the same configurations as those shown in FIG. 1. Here, the same or like portions to those of FIGS. 1 and 3 are designated by the same reference numerals, and the description thereof is omitted. In FIG. 4, the reference numeral 29 designates a gate potential setting line for establishing the gate potential of the current copier transistor 19, which is supplied from the output transistor 18; and 31 designates a dummy current copier transistor with the same size as the current copier transistor 19. The reference numeral 32 designates a dummy switching transistor with the same size as the switching transistor 24. The reference numeral 33 designates a switching transistor for selecting activation and inactivation of a switching transistor 35; and 34 designates a switching transistor for selecting activation and inactivation of the switching transistor 35 in cooperation with the switching transistor 33. The reference numeral 35 designates the transistor for causing the dummy current copier circuit 36 to flow a current a few times greater than the normal current flowing when the current copier transistor 19 is operating. The transistor 35 consists of a plurality of transistors with the same size as the transistor 18, which are connected in parallel, and is provided in the read current source unit 15. The reference numeral 36 designates the dummy current copier circuit driven when the gate potential of the current copier transistor 19 is not established.

Next, the operation of the present embodiment 3 will be described.

Since the basic operation of the present embodiment 3 is the same as that of the embodiment 1 as shown in FIG. 2, the description thereof is omitted here, and only the operation of the portions shown in FIG. 4 will be described.

The read current source unit 15 of the present embodiment 3 drives the dummy current copier circuit 36 when the switching transistors 23 and 24 are brought out of conduction, and the output of the current copier transistor 19 is interrupted, thereby enabling the gate potential setting line 29 to hold the potential applied to the gate of the current copier transistor 19 at the time when the current copier transistor 19 outputs the read current.

In the current copier circuit 16 that outputs the read current, the switching transistors 23 and 24 are turned off when the enabling terminal 20 that has been asserted is unasserted. Thus, the dummy current copier circuit 36 is driven, followed by bringing the switching transistors 33 and 34 into conduction, and by activating the transistor 35. Thus, a closed loop is formed through which the current output from the output transistor 18 flows to the ground via the gate potential setting line 29 and transistor 35.

When the close loop is established, the gate potential setting line 29 holds by the dummy current copier circuit 36 the setting potential applied to the gate of the current copier transistor 19 at the time when it outputs the read current. In addition, the gate potential setting line 29 passes the current a few times greater than the current output from the current copier transistor 19 when it supplies the read current. The current the gate potential setting line 29 carries is determined by the transistor 35 serving as the load of the close loop. Accordingly, the current flowing through the gate potential setting line 29 can be adjusted by varying the number of parallel transistors constituting the transistor 35. Although the current can be adjusted at the normal current when the current copier transistor 19 is operating, it can be adjusted to a few times greater than the normal current when the dummy current copier circuit 36 is operating to stabilize the potential of the gate potential setting line 29.

As described above, the present embodiment 3 is configured such that the dummy current copier circuit 36 holds the potential of the gate potential setting line 29 at the same potential as when the current copier transistor 19 is operating. Thus, the present embodiment 3 offers an advantage of being able to converge the potential applied to the gate of the current copier transistor 19 quickly, when the current copier transistor 19 starts to output the read current again from the state its output is interrupted.

Embodiment 4

Figure 5:
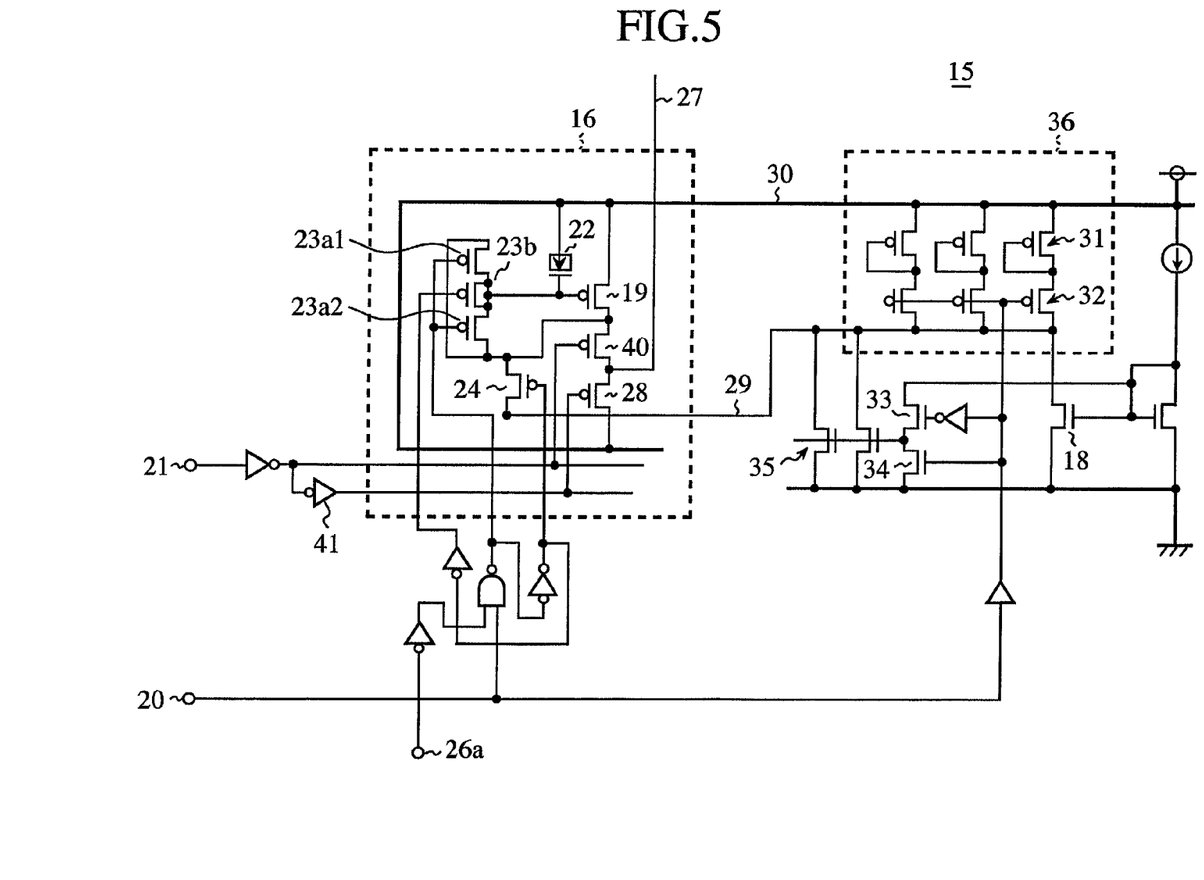
FIG. 5 is a circuit diagram showing a configuration of an embodiment 4 of the imaging device in accordance with the present invention.

FIG. 5 is a circuit diagram showing a configuration of an embodiment 4 of the imaging device in accordance with the present invention. FIG. 5 shows only a portion corresponding to the read current source unit 15 of the imaging device as shown in FIG. 1, without showing the pixel array 2 and line memory 6 with the same configurations as those shown in FIG. 1. Here, the same or like portions to those of FIGS. 1, 3 and 4 are designated by the same reference numerals, and the description thereof is omitted. In FIG. 5, reference numerals 23a1 and 23a2 designate switching transistors connected in parallel, each of which has the same size as the switching transistor 23 as shown in FIG. 1 and operates in the same manner as the switching transistor 23. The reference numeral 23b designates a feedthrough compensation transistor with the same size as the switching transistors 23a1 and 23a2. The feedthrough compensation transistor 23b has its gate supplied with the inverted signal of the signal applied to the gate of the switching transistors 23a1 and 23a2, and has its source and drain short-circuited and connected to the gate of the current copier transistor 19.

Next, the operation of the present embodiment 4 will be described.

Here, only the operation of the portions shown in FIG. 5 will be described with omitting the operation of the same or like portions to those of FIG. 1.

The gate potential of the current copier transistor 19 is affected by the parasitic capacity between the gate and source of the switching transistor 23 as shown in FIGS. 1, 3 and 4, and it is often difficult to establish the gate potential at a preferable value. The present embodiment 4 of the imaging device couples the electric charges with opposite polarities using the feedthrough compensation transistor 23b, thereby canceling out the parasitic capacity of the switching transistors 23a1 and 23a2.

The read current source unit 15 as shown in FIG. 5 includes the switching transistors 23a1 and 23a2 connected in parallel, each of which has the same size as the switching transistor 23 as shown in FIGS. 1, 3 and 4. They are equivalent to a double sized switching transistor 23, and have the same parasitic capacity as the capacity of the feedthrough compensation transistor 23b. Here, the two switching transistors 23a1 and 23a2 are used instead of doubling the size of the switching transistor 23 because of usefulness for suppressing the variations in the fabrication process.

With the foregoing configuration, it is possible to eliminate the effect of the feedthrough on the gate of the current copier transistor 19. This is because when the gate of the feedthrough compensation transistor 23b is placed at the low (high) level, the gates of the switching transistors 23a1 and 23a2 are placed at the high (low) level, and hence the electric charges stored in the parasitic capacity of the switching transistors 23a1 and 23a2 have the opposite polarity to the electric charges stored in the feedthrough compensation transistor 23b, thereby canceling out to each other. As a result, the fluctuations in the gate potential of the current copier transistor 19 can be reduced, and hence the current value read from the current copier transistor 19 becomes more accurate.

As described above, the present embodiment 4 is configured such that the feedthrough compensation transistor 23b cancels out the parasitic capacity of the switching transistors 23a1 and 23a2 connected to the gate of the current copier transistor 19, thereby stabilizing the gate potential of the current copier transistor 19. As a result, the present embodiment 4 offers an advantage of being able to stabilize the read current output from the current copier transistor 19, and to supply the pixel circuit 1 with the precise read current.

What is claimed is:

1. An imaging device for reading a pixel level by supplying a read current to a pixel circuit constituting an array column of a pixel array, said imaging device comprising:
    a read current source unit having for each array column a current copier circuit for supplying the read current to the array column;
    a memory for storing the pixel level read from said pixel circuit;
    a calculating circuit for obtaining a pixel output of said pixel circuit using the pixel level supplied from said memory; and
    a scanner for causing said read current source unit to supply the read current to the array column including the pixel circuit from which the pixel output is to be read, for causing said memory to store the pixel level of said pixel circuit, and for causing said calculating circuit to obtain the pixel output by reading the output level from said memory, wherein
    said current copier circuit has a current copier transistor and a capacitor that stores a gate potential of said current copier transistor.

2. The imaging device according to claim 1, wherein said current copier circuit provided for each array column includes a current copier transistor, and said read current source unit supplies a gate of said current copier transistor with a setting potential that causes said current copier transistor to output the constant read current.

3. The imaging device according to claim 2, wherein said read current source unit comprises a dummy circuit for holding the setting potential of the read current, which is applied to the gate of said current copier transistor, when outputs of all current copier circuits are interrupted.

4. The imaging device according to claim 2, wherein said read current source unit comprises a switching transistor for turning on and off the setting potential of the read current applied to the gate of said current copier transistor, and a feedthrough compensation transistor for eliminating feedthrough effect said switching transistor has.

5. The imaging device according to claim 1, wherein said read current source unit supplies a predetermined potential to a current feed line that is provided for supplying the read current to the array column, when the output of the read current is interrupted.

6. The imaging device according to claim 1, wherein said memory comprises a signal level memory for storing a signal level read from said pixel circuit as the pixel level, and a reset level memory for storing a reset level read from said pixel circuit as the pixel level, and said calculating circuit obtains the pixel output of said pixel circuit from the difference between the signal level read from said signal level memory and the reset level read from said reset level memory.

7. An imaging device for reading a pixel level by supplying a read current to a pixel circuit constituting an array column of a pixel array, said imaging device comprising:
    a read current source unit having for each array column a current copier circuit for supplying the read current of a same magnitude to all pixel circuits in the array column;
    a memory for storing the pixel level read from said pixel circuit;
    a calculating circuit for obtaining a pixel output of said pixel circuit using the pixel level supplied from said memory; and
    a scanner for causing said read current source unit to supply the read current to the array column including the pixel circuit from which the pixel output is to be read, for causing said memory to store the pixel level of said pixel circuit, and for causing said calculating circuit to obtain the pixel output by reading the output level from said memory, wherein
    said current copier circuit provided for each array column includes a current copier transistor, and said read current source unit supplies a gate of said current copier transistor with a setting potential that causes said current copier transistor to output a constant read current, wherein
    said read current source unit comprises a dummy circuit for holding the setting potential of the read current, which is applied to the gate of said current copier transistor, when outputs of all current copier circuits are interrupted.

* * * * *